E. I. DODDS.
MOTOR CAR TRUCK SIDE FRAME.
APPLICATION FILED MAR. 25, 1908.
926,394.
Patented June 29, 1909.
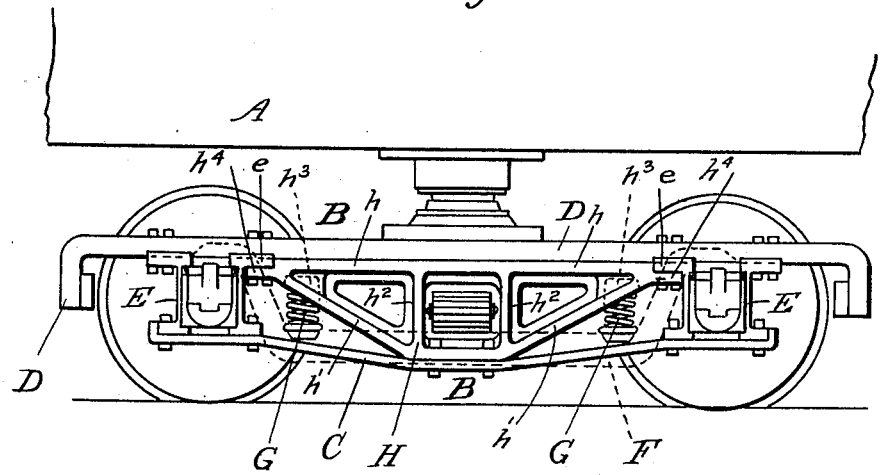
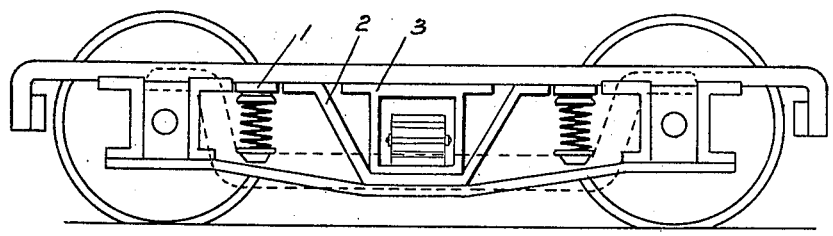
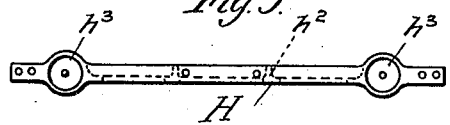
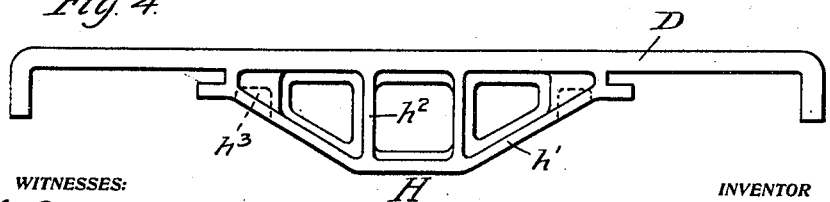
WITNESSES:
F. B. Townsend
H. W. Munday
INVENTOR
Ethan I. Dodds
BY
Munday, Evarts, Adcock & Clarke.
his ATTORNEYS

UNITED STATES PATENT OFFICE.

ETHAN I. DODDS, OF CENTRAL VALLEY, NEW YORK.

MOTOR-CAR-TRUCK SIDE FRAME.

No. 926,394.  Specification of Letters Patent.  Patented June 29, 1909.

Application filed March 25, 1903. Serial No. 423,155.

*To all whom it may concern:*

Be it known that I, ETHAN I. DODDS, a citizen of the United States, residing in Central Valley, in the county of Orange and State of New York, have invented a new and useful Improvement in Motor-Car-Truck Side Frames, of which the following is a specification.

My invention relates to improvements in side framing of motor car trucks such as used in subways and interurban service, and where the electric motors are suspended from the truck structure.

The object of my invention is to provide an improved construction of motor car truck side framing, which will be simple and economical to manufacture, and in which all the parts of the truck side framing will cooperate to mutually reinforce and strengthen each other, and which will be much stronger and more durable than the constructions heretofore in use.

A further object is to so construct my reinforcing cast steel member having the clamps, tension member, compression member and spring seats cast all integral together, that the same may be readily applied without material cost or expense as a reinforcement in the ordinary constructions of such motor car trucks now in use, and which have proven too weak to answer the requirements of continued service.

My invention consists in the means I employ to practically accomplish this object, as more particularly specified in the claims.

In the accompanying drawing forming a part of this specification, Figure 1 is a side elevation of a motor car truck side framing embodying my invention. Fig. 2 is a diagrammatic view illustrating the old construction of side framing heretofore commonly in use, for the purpose of better indicating how my reinforcing cast steel member may be applied thereto without materially disturbing the other parts of such trucks as are now in use all over the country and need to be reinforced. Fig. 3 is a bottom view of my reinforcing cast steel member. Fig. 4 illustrates a modification in which the upper or compression member of the truck side frame is made integral with my reinforcing cast steel member.

In the drawing, A represents a portion of a motor car such as is commonly used in subways and interurban service, and B the truck thereof upon which the electric motor is suspended.

C represents the lower or tension member of the truck side framing, D the upper or compression member, E E the pedestals, F the equalizer bar, G the springs and H my improved cast steel reinforcing member having an integral compression member $h$ extending between and abutting against the pedestals at its ends, an integral tension member $h^1$, integral strut member $h^2$, integral spring seats $h^3$ and integral notched ends or clamp members $h^4$ embracing the flanges $e$ of the pedestals. The cast steel reinforcing member H is made deeper at the strut portion $h^2$ thereof than the pedestals E so that the tension member C will be depressed at its middle and thus always have a proper tension action in reinforcing the truck structure as a whole.

To apply my improved steel reinforcing member H to an old construction of motor car truck requiring reinforcement, the separate piece spring seats $1$, as shown in Fig. 2 together with the separate piece tension members 2 and the separate piece struts 3 are all removed, and my integral cast steel member H substituted in place of all these parts, as will be readily understood from Figs. 1 and 2 of the drawing.

My improved casting H may be applied to almost any motor truck having the equalizer bar and two springs resting on it by simply changing the holes in the compression member to suit those in the old truck to which the reinforcing casting H is to be applied.

In the modification illustrated in Fig. 4, the compression member D and casting H are both made in one integral piece, the construction and operation being otherwise the same.

I claim:—

1. In a motor car truck side framing, the combination of the upper compression member, lower tension member and pedestals, of a reinforcing cast steel member having an integral compression member extending between the pedestals, an integral tension member and an integral strut member, said casting having notched ends to embrace the upper inner flanges of the pedestals, substantially as specified.

2. In a motor car truck side framing, the combination of the upper compression member, lower tension member and pedestals, of a reinforcing cast steel member having an integral compression member extending between the pedestals, an integral tension member and an integral strut member, said casting having notched ends to embrace the upper inner flanges of the pedestals and said casting having integral spring seats, substantially as specified.

3. In a motor car truck side framing, the combination of the upper compression member, lower tension member and pedestals, of a reinforcing cast steel member having an integral compression member extending between the pedestals, an integral tension member and an integral strut member, said casting having notched ends to embrace the upper inner flanges of the pedestals, the middle or strut portion of said casting extending below the pedestals so that the lower tension member assumes a bent form, substantially as specified.

ETHAN I. DODDS

Witnesses:
WILLIAM A. GEIGER,
H. M. MUNDAY.